United States Patent

[11] 3,590,921

[72] Inventor Roy A. Brunjes
 New Iberia, La.
[21] Appl. No. 883,725
[22] Filed Dec. 10, 1969
[45] Patented July 6, 1971
[73] Assignee Texaco Inc.
 New York, N.Y.

[54] OIL-WELL-TYPE FISHING TOOL
 5 Claims, 4 Drawing Figs.
[52] U.S. Cl. .................................................. 166/99,
 294/86.3
[51] Int. Cl. .................................................E21b 31/08,
 E05c 19/06

[50] Field of Search........................................... 166/98, 99,
 224; 294/86.1, 86.13, 86.14, 86.16, 86.26—86.33

[56] References Cited
 UNITED STATES PATENTS
 885,478 4/1908 Hollingsworth .............. 294/86.3
 1,732,962 10/1929 Brust, Jr. ...................... 294/86.3

Primary Examiner—James A. Leppink
Attorneys—Thomas H. Whaley and Carl G. Ries

ABSTRACT: A fishing tool for oil well use. It has a recovery chamber with a piston actuated wedge therein. The wedge will force a fish against teeth near the opening of the chamber to hold the fish securely.

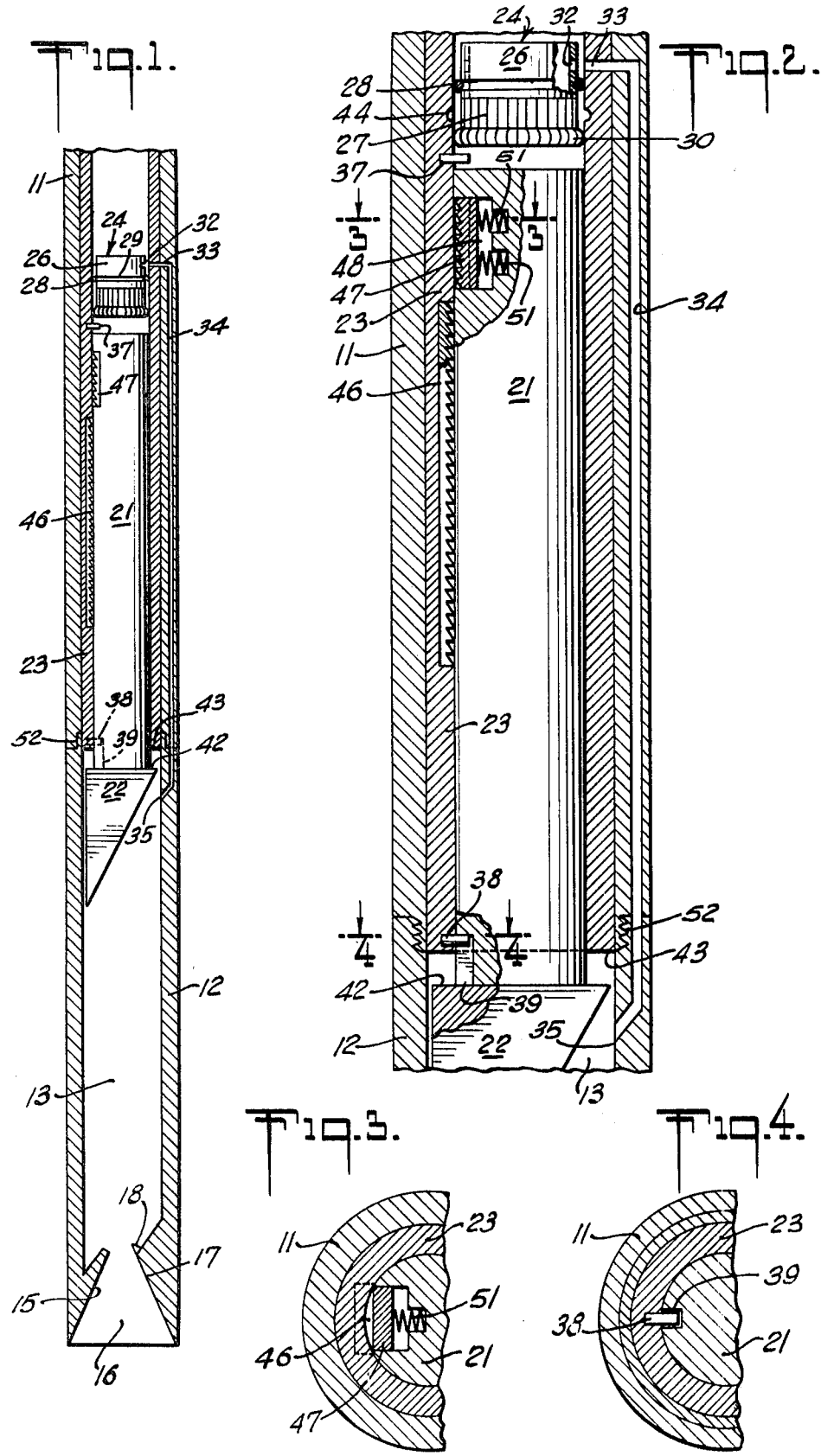

OIL-WELL-TYPE FISHING TOOL

BACKGROUND OF THE INVENTION

1. Field of the Invention

This invention relates to oil well tools generally. More specifically the invention pertains to a fishing tool that has improved structure to hold and grip a fish securely.

2. Description of the Prior Art

Various fishing tools have been constructed with magnetic holding elements and the like, for retaining the so-called fish within the tool while it is withdrawn to the surface. However, there has been no known provision of a positive mechanical gripping arrangement, other than the well-known threaded-spear-type arrangement, etc., for holding and withdrawing a fish that is stuck in the borehole.

SUMMARY OF THE INVENTION

The invention relates to a fishing tool for use in oil wells and the like. It comprises a guide shoe having an open end for being lowered over a fish and having a recovery chamber therein. There are inward sloping teeth near the said open end for gripping said fish. The invention also comprises a light piston having an integrally attached wedge thereon, the said wedge being located in said recovery chamber. The invention also comprises a light shearpin for restraining said piston against upward movement relative to said tool during downward movement of the tool in the well, and a fluid flow channel for bypassing said piston and wedge during the downward movement. The invention additionally comprises a sleeve valve having a sleeve located above said piston with detent means for holding said sleeve valve closed after actuation thereof. The invention also comprises means for limiting the upward movement of said wedge and piston plus heavy shearpin for restraining said piston against downward movement relative to said tool, and groove means cooperating with said heavy shearpin for permitting free upward movement to said limit. The said piston is movable upward relative to said tool after said light shearpin has sheared, and the said upward movement actuates said sleeve valve to its closed position. In said combination, the said piston and wedge are movable downward relative to said tool for causing the wedge to force the fish against said teeth when sufficient pressure is applied to said piston to cause said heavy shearpin to be sheared. And, in addition, the combination comprises ratchet means cooperating with said piston during said wedging action to hold the fish in place after release of pressure on said piston.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic longitudinal cross section, illustrating a tool according to the invention;

FIG. 2 is an enlarged showing of the moving parts of the tool illustrated in FIG. 1;

FIG. 3 is a fragmentary lateral cross section view, taken along the lines 3–3 in FIG. 2 looking in the direction of the arrows; and FIG. 4 is another fragmentary lateral cross section view, taken along the lines 4–4 of FIG. 2 looking in the direction of the arrows.

DESCRIPTION OF THE PREFERRED EMBODIMENT

With reference to the figures of the drawings, it is pointed out that a tool according to this invention is one that is designed for use in oil well operations. It will be appreciated that the showing is schematic, and of course the tool may be constructed with various dimensions. One criterion is that depending upon the size of the wells for which the tool is designed.

In many oil-well-drilling operations a part of some previously used equipment may become stuck in the borehole, particularly where there are crumbling deposits from the borehole walls. Furthermore, there may be various different types of so-called "junk" that becomes lodged in a borehole and irregularly shaped fish are difficult if not impossible for the heretofore known types of fishing tools to remove. One reason for this is because the prior types of fishing tools did not provide sufficient grip on the so-called fish to be able to pull it free, where it had become lodged by reason of crumbling borehole walls or the like. A tool according to this invention provides for a strong mechanical gripping that will permit the pulling loose of many a heretofore unrecoverable fish.

As already indicated, the drawings represent a schematic showing of structure for a tool according to this invention. There is a body portion 11 that is generally cylindrical and hollow. It has attached thereto at the lower end (as viewed in the drawings) a guide shoe 12. The guide shoe is hollow and provides a recovery chamber 13 therein. At the lower end of chamber 13 there is an opening 16 which has tapered walls 15 and 17 (FIG. 1) which lead to the interior of chamber 13. Around a portion, e.g. about one-half of the periphery of opening 16 and located at the upper edge of the tapered wall 17, there are a plurality of tempered teeth 18 that are pointed upwardly toward the inside of the chamber 13. These are securely fastened onto the upper edge of the tapered wall 17. It will be understood that these teeth 18 will be constructed and mounted in any feasible manner so as to be hard enough to bite into the fish and securely mounted enough to withstand the lifting forces applied.

Within the body 11 of the tool, there is a piston 21 that is located above and extends into the chamber 13. There is an integrally attached wedge 22 at the lower end (as viewed in the drawings) of the piston 21. The piston is situated for longitudinal movement within a cylindrical sleeve 23 that is securely fastened on the inside of the body 11 of the tool.

Situated above the piston 21 and inside of the sleeve 23, there is a sleeve valve 24. This valve might take different forms. However, in the schematic illustration, it includes a solid sleeve 26 which has attached at the lower edge thereof a plurality of petal springs 27. The latter have rounded end members 30 which are biased radially outward against the inner surface of the sleeve 23 under spring pressure.

The sleeve 26 might be constructed so as to have a fluidtight sliding fit (not shown) within the sleeve 23. However, preferably it is constructed with an O-ring seal, or gasket 28. This O-ring is carried in a groove 29 on the outside of the sleeve 26. The O-ring will act to provide a fluidtight seal for preventing fluid flow past the sleeve 26 on the outside thereof.

There is a port 32 in the sleeve 26 through which well fluid may pass. There is a matching passageway, or port 33 that is aligned with the port 32 when the sleeve 26 is in the position illustrated in FIGS. 1 and 2. Also, there is a bypass passageway 34 that runs longitudinally down within the body 11 of the tool and comes out to connect with the chamber 13 below the wedge 22 at an opening 35.

It will be appreciated that the bypass 34 might take the form of a plurality of passages (not shown) if desired, so long as there is sufficient cross-sectional area to permit adequate fluid flow. The amount of fluid flow must be enough to allow the tool to be lowered downward in the borehole easily while permitting borehole fluid to bypass the piston 21 and related elements. It will be appreciated, of course, that there would be corresponding additional ports (not shown) in the sleeve 26, as required.

Above the piston 21 there is a lightweight shearpin 37 that is fixed into the sleeve 23 and extends radially into the path of the piston 21. This acts to hold the piston in its illustrated position as the tool is lowered into the hole. There is a heavy-duty shearpin 38 that is located in the wall of the sleeve 23, near the lower end of the piston 21. This pin 38 extends into the path of the body of piston 21 to restrain downward movement of the piston relative to the tool (sleeve 23). However, there is a groove 39 in the body of the piston 21. This groove extend longitudinally parallel to the axis of the piston 21 and is large enough to freely accommodate the inner end of the pin 38 so as to permit limited movement of the piston 21 upward without shearing the pin.

The wedge 22 has a maximum outside diameter that is greater than the diameter of the piston 21 to which it is attached. This provides for limiting the upward movement of the piston by positive stop action when a shoulder 42 comes in contact with a bottom edge 43 of the sleeve 23. This limited upward movement of piston 21 is designed to be only that which is sufficient to cause shifting of the sleeve valve 24 to its closed position. It will be observed that there is an annular round-bottomed groove 44 on the walls of the sleeve 23. This groove 44 has a complementary shape relative to the rounded ends 30 of the petal springs 27 so that they act as a detent when the valve 24 is closed.

There is a ratchet arrangement for the piston movement. It includes a longitudinally extended rack 46 that is mounted embedded axially along one side of the sleeve 23. It comes into play after the piston 21 has moved down below the illustrated position a predetermined distance. There is a spring-loaded short pawl 47 that has teeth sloped upward so that they will ratchet over the downward sloping teeth of the rack 46. The pawl 47 is mounted to permit radial movement bodily in a short longitudinal groove 48. There are a pair of coiled sprints 51 situated behind the pawl 47 for applying spring bias urging the pawl radially outward against the wall of the sleeve 23.

It may be observed that there is a tool joint 52 between the body 11 and the shoe 12. This is located adjacent to the bottom of the sleeve 23 so as to allow easy replacement of the shearpin 38.

Operation

The operation of the foregoing tool is as follows. The tool will be lowered in a borehole (not shown) until the fish (not shown) enters chamber 13 and contacts the wedge 22. During downward movement before such contact has been made, the well fluid may flow through the inside of the tool so as to facilitate such downward movement through the well fluid. Otherwise, since the tool would substantially fill the bore area in which the tool moves, there would be undesired resistance to such downward travel by the tool. The well fluid flow through the interior of the tool may be traced from within the chamber 13 to the internal bypass around the piston 21. The path of flow is in the opening 35 and through the passageway 34. Then it flows out above the piston through the ports 33 and 32 to the interior hollow portion of the tool above the piston 21.

After the fish has come in contact with the wedge 22, the tool will be lowered further down so that the upward force caused by the fish pushing against the wedge will push the piston 21 up until the shoulder 42 of the wedge contacts the lower edge 43 of the sleeve 23. However, before this position is reached, the force will have had to exceed that required to shear the lightweight shearpin 37.

At the terminal position of the piston 21 upward (which position was just described), the top of the piston will have pushed the sleeve 26 up until the springs 27 expand radially outward as the rounded ends 30 fall into the groove 44. This gives the detent action to maintain the sleeve valve 24 closed thereafter. In the closed position of the valve, the seal 28 is above the port 33 and in addition the port 32 is no longer aligned with the port 33.

With the slide valve 24 closed, the pressure will be increased on the fluid in the interior of the tool until the piston 21 moves back down far enough to contact the shearpin 38. Then additional pressure will shear the pin 38 and move the piston and wedge down upon the fish. This will wedge the fish over onto the teeth 18 while the ratchet acts to prevent a loosening of the grip thus obtained. Then the tool will be raised to lift the fish from the borehole.

It will be appreciated that the tool is run into the borehole on tubing in order to be able to apply pump pressure on the fluid from the surface. Consequently, if desired, a bypass tool (not shown) might be mounted above the fishing tool. Then, opening of the bypass tool would permit circulation after the fish had been engaged.

In addition to the bypass tool, a set of so-called jars might be run in conjunction with the fishing tool. This would permit jarring to loosen the fish. Furthermore, if the fish should remain stuck, a continued jarring coupled with intermittent application of pump pressure on the piston (with the bypass tool closed again) would eventually shear the fish at the teeth 18 so that the tool could be recovered.

It will be observed that the action of this tool is positive and strong so that a heavy pull may be provided in lifting a fish even where the fish is firmly wedged within the borehole. This permits recovery of a fish under circumstances where the previous actions available were only those involving drilling out, or bypassing, or cutting off, etc. of the fish.

While a particular embodiment of the invention has been described above in considerable detail in accordance with the applicable statutes, this is not to be taken as in any way limiting the invention but merely as being descriptive thereof.

I claim:

1. A fishing tool for use in oil wells and the like, comprising
   a guide shoe having an open end for being lowered over a fish,
   gripping means on said guide shoe for holding said fish therein, and
   means for pushing said fish against said gripping means for positive holding of the fish, which comprises
      a wedge,
      piston means for moving said wedge in said guide shoe toward said pin end,
      a fluid flow channel for bypassing said piston means during entry in the well,
      valve means for closing said channel, and
      means for actuating said valve means when said wedge contacts the fish.

2. A fishing tool according to claim 1 wherein said gripping means comprises
   inward sloping teeth near the open end of said guide shoe.

3. A fishing tool according to claim 2 wherein said valve actuating means comprises
   a sleeve located adjacent to one end of said piston means,
   said piston means having limited movement away from said open end of the guide shoe to slide said sleeve and close said valve.

4. A fishing tool according to claim 3 further including
   ratchet means cooperating with said piston means for holding said wedge against said fish after pressure has been released from the piston.

5. A fishing tool for use in oil wells and the like, comprising
   a guide shoe having an open end for being lowered over a fish and having a recovery chamber therein,
   inward sloping teeth near the said open end for gripping said fish,
   a piston having an integrally attached wedge thereon,
      said wedge being located in said recovery chamber,
   a light shearpin for restraining said piston against upward movement relative to said tool during downward movement of the tool in the well,
   a fluid flow channel for bypassing said piston and wedge during the downward movement,
   a sleeve valve having a sleeve located above said piston,
      detent means for holding said sleeve valve closed after actuation thereof,
   means for limiting the upward movement of said wedge and piston,
   a heavy shearpin for restraining said piston against downward movement relative to said tool,
      groove means cooperating with said heavy shearpin for permitting free upward movement to said limit,
   said piston being movable upward relative to said tool after said light shearpin has sheared,
      said upward movement actuating said sleeve valve to its closed position, said piston and wedge being movable downward relative to said tool for causing the wedge to force the fish against said teeth when sufficient pressure is applied to said piston to cause said heavy shearpin to be sheared, and ratchet means cooperating with said piston during said welding action to hold the fish in place after release of pressure on said piston.